April 13, 1937.  L. J. NOWAK, JR  2,077,152
WEIGHING MACHINE
Filed Jan. 10, 1936
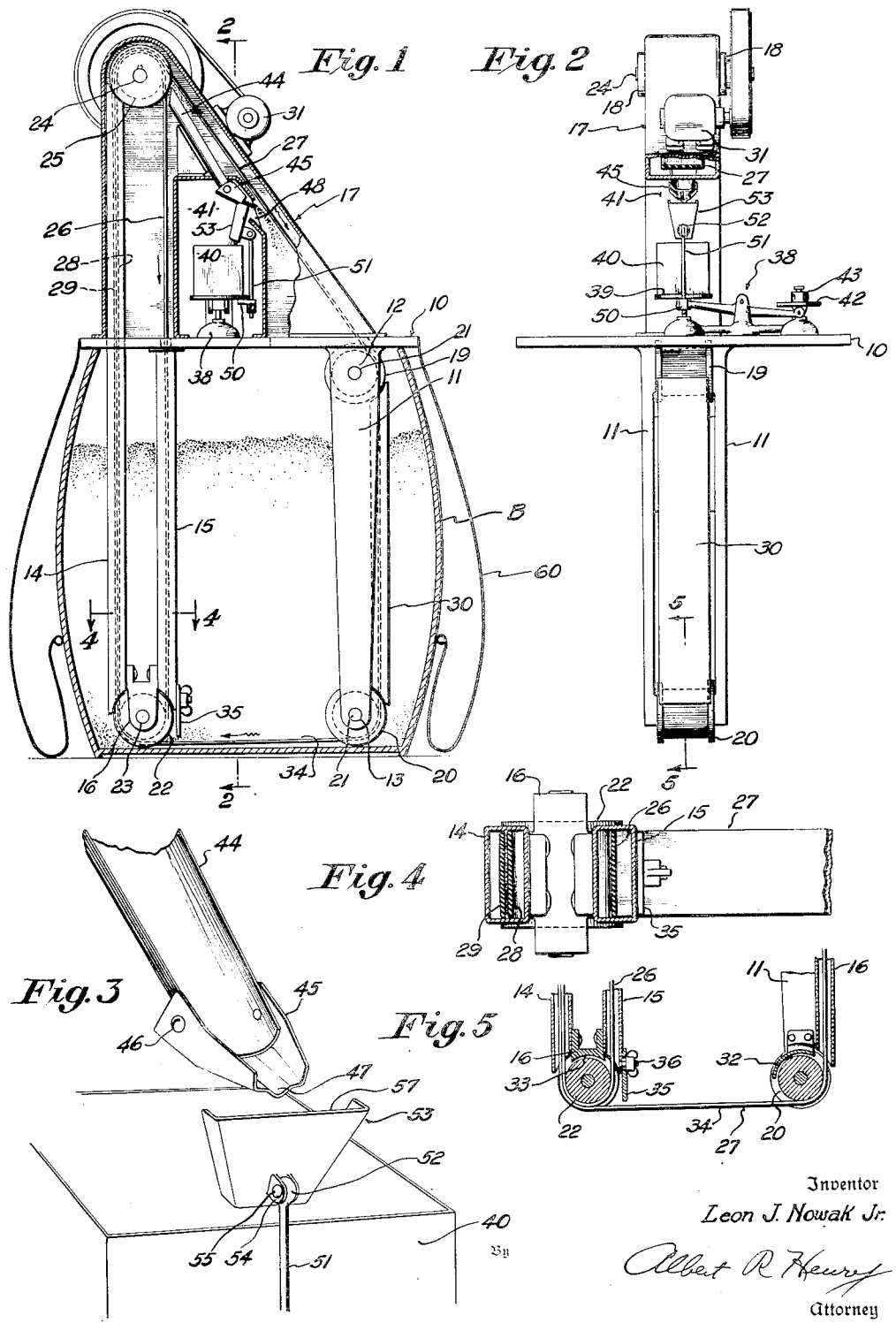
Inventor
Leon J. Nowak Jr.
By Albert R. Henry
Attorney Patented Apr. 13, 1937

2,077,152

UNITED STATES PATENT OFFICE 2,077,152

WEIGHING MACHINE

Leon J. Nowak, Jr., Buffalo, N. Y.

Application January 10, 1936, Serial No. 58,466

10 Claims. (Cl. 249—58)

This invention relates to apparatus for filling containers with predetermined quantities of pulverulent materials, and it has particular reference to a machine of simple construction for delivering to a container an accurately measured amount of a fluent commodity.

It is quite customary to sell various powdered or granular substances, such as washing soda, sugar or cocoa, in boxes or other packages containing a definite weight or volume of such merchandise. Sensible manufacturing practice, as well as various fair trade regulations, impose on the manufacturer or merchant the necessity of maintaining the quantity very close to that specified on the carton. The various commodities which are to be so measured, however, have differing physical properties, particularly with respect to their tendency to pack into a lumpy or non-fluent form. Again, the tolerances permissible for different types of material, or different measures thereof, may also vary, and hence it is quite difficult to utilize many prior art machines for more than one or two commodities, or for various weights of the same material. Serious economic problems have arisen, therefore, in obtaining the automatic measuring of a number of ingredients without undue expense or loss of accuracy.

The present invention undertakes a solution of this problem by providing a weighing or measuring apparatus which is relatively simple in principle and form, and hence is inexpensive, but which nevertheless is sensitive and extremely accurate. According to one aspect of the invention, it is proposed to devise an apparatus in which a stream of pulverulent material is created and caused to flow freely in a predetermined path. Adjacent this stream of fluent material is placed a movable deflector whose position is controlled by the quantity intended to be delivered to the package, and which operates in the manner of a hand to reach into the stream, take just the amount desired and deliver it to the package, and then immediately withdraw until a new package is to be filled.

In another aspect of the invention, it is proposed to provide a conveyor system to carry the material to the deflector, which conveyor has been found to be suited to a wide variety of substances heretofore found difficult to handle without packing.

In still another aspect of the invention, there is contemplated a portable weighing and conveying unit which can be placed over any desired bin, barrel, or other container, to measure out its contents into separate packages, thus providing a device which may be employed in a universal fashion.

Various other features of the invention, and the advantages to be derived from the practice thereof, will appear from a perusal of the following description of one embodiment, illustrated in the accompanying drawing, wherein:

Fig. 1 is a side elevation of the weighing machine with a portion of the housing broken away;

Fig. 2 is a section on the line 2—2 of Fig. 1, taken through the housing with the remaining elements shown in elevation;

Fig. 3 is a perspective view of the chute and deflector members;

Fig. 4 is an enlarged section on the line 4—4 of Fig. 1;

Fig. 5 is a section on the line 5—5 of Fig. 2.

The weighing machine as shown in Fig. 1 is devised as a portable unit having a circular table or head 10, which is adapted to fit over the open top of a barrel "B" which contains the commodity to be weighed. The head 10 is provided with a conveyor supporting frame including integral depending brackets 11 having bearing portions 12 and 13 provided therein, and rectangular tubes 14 and 15 whose lower extremities support a bearing member 16. The tube 14 is supported by and extends through the head, and its upper end is enclosed by a sheet metal housing 17 which is provided with aligned bearings 18.

Flanged pulleys 19 and 20 are disposed between the brackets 11 and they are rotatably mounted on pins 21 in the bearing portions 12. Similarly, a flanged pulley 22 is mounted in the bearing member 16 by a pin 23. The upper bearings 18 receive a driven shaft 24 to which is keyed a driven pulley 25 of similar construction. These pulleys provide a mounting means for a belt conveyor which consists of a belt 26 extending about the pulleys 22 and 25, and a second belt 27 extending about the pulleys 19, 20, 22 and 25. It will be observed that the superimposed vertical reaches of the belts 26 and 27, as indicated by the numerals 28 and 29 respectively, are enclosed for their entire extent within the tube 14 (Fig. 4). Similarly, the remaining portions of the belts 26 and 27 within the barrel are enclosed in the described tube 15 and in a third tube 30, respectively, the latter tube being secured between the brackets 11.

The belts are driven by an electric motor 31, which is connected to operate the shaft 24 by means of a pulley and belt connection. The direction of rotation of the belts is clockwise as viewed in Fig. 1, so that, as the belts rotate, the granular material is introduced between the belts at the pulley 22, and thence it is conveyed vertically with the reaches 28 and 29 to the pulley 25, where the belts separate and the material is released.

The tubes cooperate to insure the proper operation of the conveyor, the shorter tubes 15 and 30 acting to shield the right hand reaches of the belts and the underlying pulleys from the surrounding material, which otherwise would be introduced therebetween and block their operation. Additional protection is afforded by a sheet metal shield 32 disposed about the upper portion of the pulley 20, and a curved formation 33 on the bearing member 16 which protects the upper surface of the pulley 22. The long tube 14 serves likewise as a shield, since it prevents distortion of the superimposed belts, which would be occasioned if they were forced to be operated through the granular material. Additionally, this tube, in lightly contacting the edges of the belts, prevents the loss of any portion of the load during transit.

The lower reach 34 of the belt 26 conveys a supply of material to the point of entry of the double belt structure, and, with certain types of material, it has been found that this supply is irregular, resulting in the intermittent conveyance of excessive volumes of material. Thus, a gage member 35 is provided which is adjustably mounted on the tube 15 by a bolt 36, whereby its extremity may be positioned over the reach 34 to limit the supply of material to the conveyor belts.

This type of conveyor, together with its associated structures, is particularly efficient in use with material which is subject to lump formation, wherein the gage member 35 acts as a selector to discard the larger lumps, while the smaller lumps, during their passage through the belts, are broken and restored to their original state before introduction into the weighing elements of the machine. It has been found that material conveyed between the slightly spaced belts is somewhat pressed or squeezed with the result that entrapped air is eliminated to a large extent, thereby permitting the material to pack more tightly in the package. Such air elimination in the conveyor is advantageous, since it obviates settling in the carton, or the employment of shaking equipment to eliminate such air while the carton is being filled.

A scale 38 is secured to the top of the head 10 and one of its platforms 39 is disposed in a tunnel 41 formed in the housing 17, where it is adapted to receive the package or carton to be filled, as indicated by the numeral 40. The remaining platform 42 of the scale is disposed exterior of the housing, where it may receive suitable weights 43.

The package is supplied with the granular material through a delivery structure comprising a chute 44, having its upper end positioned adjacent the pulley 25 where it may receive material ejected from the conveyor belts 26 and 27. The lower end of the chute 44 extends through the wall of the tunnel 37, and it is provided with an adjustable nozzle 45, which is secured thereto by screws 46 (Fig. 3). It will be noted that the nozzle is formed with a V-shaped depression 47 along its medial line; thus the material, which is gravitationally fed down the chute 44, emerges freely from the nozzle in a solid stream of a somewhat triangular cross-section. The material is thence redirected to the hopper or barrel "B" through an opening 48 in the sidewall of the tunnel 41.

The scale platform 39 is provided with a lug 50 for supporting a vertical rod 51 having an eye 52 formed in its upper extremity on which is mounted a deflector or valve 53. The deflector is formed with lugs 54 which are secured to the eye 52 by a screw 55. The deflector is positioned so that, when the platform 39 is in its elevated position (Fig. 2) its upper edge 57 is interposed in the lower or angular portion of the stream emerging from the nozzle 45; thus the deflector may be set to interrupt any portion of the stream which seeks to return to the barrel and to divert it in a guided path into the container 40.

As the material introduced into the container 40 approaches the desired quantity, the scale platform 39 falls, and accordingly the accompanying deflector 53 is withdrawn from the stream, thus immediately preventing the introduction of more material into the container, which may then be removed and replaced by an empty container for a resumption of the weighing cycle. During the withdrawal of the deflector, it will be noted that the deflected portion of the granular stream is progressively diminished, owing to the previously mentioned angular formation thereof. Thus the scale beam is not influenced by inertia effects during its movement, and an extremely accurate result is obtained.

The machine is easily inserted in a full barrel of even the finest granular material by oscillating the frame while the belts are driven, whereupon the depending portions of the structure, in effect, dig their way into the material until the head 10 contacts the top of the barrel. To prevent the escape of finer particles during this and the succeeding weighing operations, a canvas boot 60, carried by the head, is secured about the barrel to provide a seal.

It is not intended to limit the invention to the precise type of conveyor or to other mechanical forms herein utilized, since obviously the principle of operation, as set forth in the accompanying claims, may be employed by those skilled in the art in numerous types of installations.

I claim:

1. A measuring apparatus comprising an inclined chute having an open lower end, means for delivering material to be measured to the upper portion of the chute for movement therethrough under the force of gravity, the length and inclination of the chute being such as to cause material flowing therethrough to continue to flow in space in a substantially solid stream after discharge from said lower end, a scale disposed adjacent said lower end, said scale having a movable package-receiving platform adapted to sustain a package adjacent to, but out of, the normal course of said stream, a deflector connected to said platform, said deflector being so disposed with respect to said stream that it enters the course thereof and diverts a portion of the stream into the package on said platform, said deflector being totally removed from said stream when said package is loaded with a predetermined quantity of material.

2. Means for delivering a predetermined weight of powdered material to a package comprising a scale provided with a package-receiving platform having a substantially vertical movement, an inclined chute disposed above said platform, said chute being adapted to receive at its upper end the material to be measured and to discharge the same into space at its lower end, the lower end of the chute being open, said chute being of such length and inclination as to cause material discharging therefrom to flow in space in an inclined substantially solid stream, a rod projecting upwardly from said platform to a point adjacent the course of said stream, an angularly disposed deflector on the upper end of the rod, the upper end of the deflector being interposed in said course when the platform is in its upper position, and being moved entirely out of said course when the platform is in its lower position, the discharge end of the deflector being over said platform, whereby material deflected thereby may fall into a package placed on said scale.

3. A measuring apparatus comprising a table adapted to be placed above a bin containing the material to be measured, a conveyor extending from below the table to a point thereabove to elevate such material, a receiving chute disposed above the table and having an open lower end, said chute having its upper end adjacent the conveyor to receive such material and being angularly disposed to permit such material to slide therethrough, said table being formed with an aperture disposed at such distance from said open lower end as to receive material discharging therefrom for return to said bin, the said lower end and aperture being vertically and horizontally spaced to provide an inclined free path in space for the material, a scale mounted on the table, said scale being provided with a package-receiving platform adapted to move in response to the weight supported thereby, a deflector connected to the scale for movement in unison therewith, said deflector being so disposed with respect to said free path as to enter the same when said platform is unloaded and to be entirely removed therefrom when said platform is loaded, said deflector being so disposed with respect to the platform as to deliver material engaged thereby into the package on said platform.

4. A measuring apparatus comprising a table adapted to be placed above a bin containing in bulk the material to be measured, a housing extending upward from the table, a frame extending downward from the table and adapted to enter the bin, pulleys mounted in the frame and housing, endless belts extending between the pulleys to provide a belt conveyor for lifting material from the bin to above the table, means associated with said belts for holding material thereon during its upward travel, a receiving chute disposed on the frame above the table to receive at its upper end the material delivered by the belts, said chute having an open lower end and being of such length and disposed at such an angle that material deposited therein will slide freely therethrough and continue to move through space in a substantially solid stream which is also angularly disposed with respect to the table, a scale on the table, said scale having a package-receiving platform disposed adjacent to, but entirely out of the course of said stream, whereby material in said stream will normally be discharged from the chute to a point removed from the platform, said platform being movable in an up and down direction in response to load imposed thereon, a deflector connected to said scale for vertical movement with said platform, the upper end of the deflector being so disposed with respect to said course that it enters the stream when the platform is unloaded and diverts material therefrom into the package on said platform, said deflector being entirely out of said stream when the platform moves downward.

5. A measuring apparatus comprising a table adapted to be positioned over a bin containing the material to be measured, a housing extending above the table, a pulley mounted on the housing, a frame extending downward from the table, a pulley mounted on said frame, an endless belt extending between the pulleys, a second pulley mounted on said frame, a second belt extending around the two first named pulleys and last named pulley, whereby the first and second belts are in contact for a portion of their path, but are spaced throughout another portion, means for driving said belts with their contacting portions moving in an upward direction to convey therebetween the material to be measured to a point above said table, a chute secured to said housing above the table, said chute having an open upper end adapted to receive the material discharged from said belts at their point of divergence adjacent said first named pulley, said chute being angularly inclined to the table and of such length that material deposited therein will slide therethrough for inclined special discharge in a substantially solid stream, said table being formed with an aperture so spaced with respect to the delivery end of said chute as to catch substantially all of such stream when moving in its normal path, a scale mounted on said table adjacent to, but entirely out of, the course of such stream, said scale being provided with a package-receiving platform, and a deflector movable with the scale adapted to enter said stream to divert material therein to said platform when said scale is unloaded, but to move entirely out of said stream as said scale receives its predetermined load.

6. In a measuring apparatus, a table, a housing above the table, a pulley mounted in the housing, a second pulley mounted below the table, an endless belt extending between said pulleys, a second pulley mounted below the table in spaced relation to said second named pulley, a second belt extending around all of said pulleys, means for rotating one of said pulleys thereby to drive said belts partly in contact and partly in separate paths, the direction of movement over the contacting portions between said two pulleys being upward to lift material entrapped between said belts to a point above the table, the belts during their upward travel compressing the material therebetween and functioning to de-aerate the same, tubes secured to the table and enclosing the portions of the belts below said table, a receiving chute having an open upper end disposed on said housing adjacent the upper pulley, said chute having a lower end disposed adjacent said table, a scale mounted on the table, said scale having a package-receiving platform disposed adjacent the lower end of said chute, and means associated with said scale to deliver to said platform limited and predetermined quantities of material deposited in the upper end of said chute and discharging from the lower end thereof.

7. A measuring apparatus comprising an inclined chute having a nozzle secured to its lower extremity, said nozzle having an angular formation in its delivery end whereby a stream of material emerging therefrom is substantially triangular in cross-section, means for delivering material to the upper portion of the chute, a scale disposed adjacent said nozzle and having a movable package-receiving platform, and a deflector adjustably connected to the platform and being so disposed with respect to the stream from said nozzle that it enters an angular portion thereof and diverts it into the package on said platform, said deflector being totally removed from said stream when said package is loaded with a predetermined quantity of material.

8. The combination with a measuring apparatus including means adapted to receive a package to be filled and means for predetermining the quantity of material to be deposited in said package, of a conveyor for conveying material to a point for delivery to said package, said conveyor comprising a pair of belts widely spaced at at least two points and only slightly spaced at a third point, the said widely spaced points respectively constituting points of admission of material between said belts and discharge of material from between said belts, the slightly spaced region of said belts being located between said widely spaced points, the spacing between said belts at said third point being such as to hold material between said belts under light pressure, whereby material may be conveyed from said admission point to said delivery point between said belts and air entrapped in said material may be eliminated.

9. A measuring apparatus comprising means for discharging a stream of material into space, a weighing scale disposed adjacent to but out of the spacial path of said stream, said scale being adapted to weigh material diverted thereto from said stream, and means for diverting portions of said stream to said scale, said last named means comprising a deflector connected to said scale to partake of the movement thereof from unbalanced to balanced position, said deflector being so disposed relative to said spacial path as to be in said path when the scale is in unbalanced position and to be totally outside of said path when said scale moves to balanced position.

10. A measuring apparatus comprising, in combination with means for establishing and maintaining a flow of material in a spacial path, means for diverting predetermined portions of said stream therefrom, said last named means comprising a weighing scale disposed adjacent to but out of said stream, said scale being adapted to support a container for diverted material, a deflector connected to said scale for movement therewith from unbalanced to balanced position, said deflector being so disposed with respect to said stream as to be located therein to divert material therefrom into said container when the scale is in unbalanced position and to move progressively and totally out of said stream as the scale moves to balanced position under the effect of diverted material.

LEON J. NOWAK, Jr.